Oct. 11, 1927.
H. HENSEL
1,645,425
SAUSAGE CASING AND METHOD OF MAKING THE SAME
Filed Nov. 10, 1926
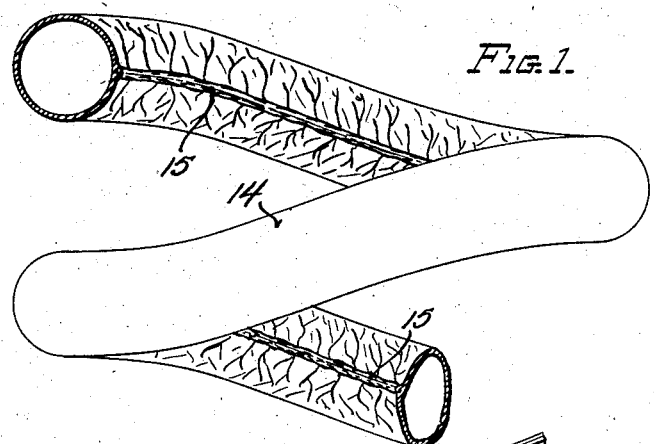
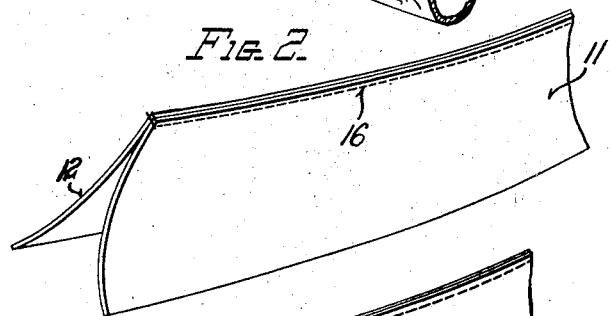
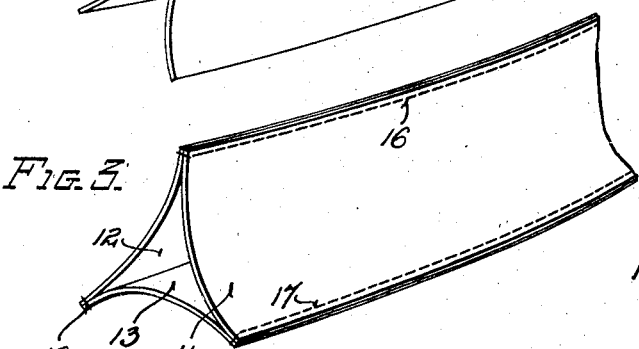
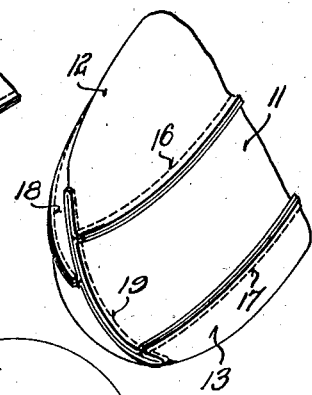
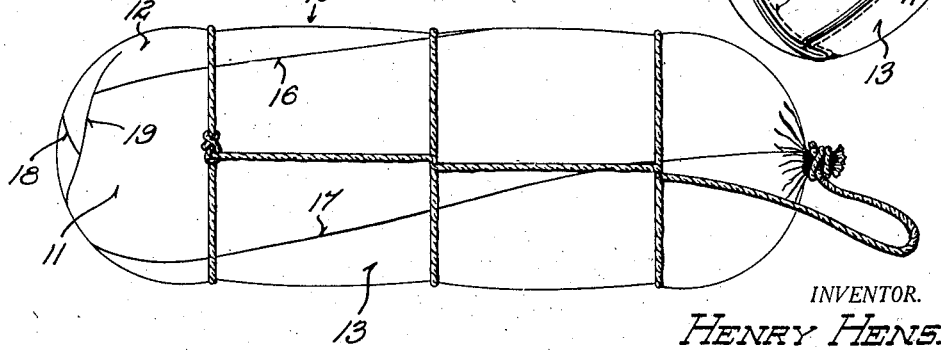
INVENTOR.
HENRY HENSEL
BY
ATTORNEY.

Patented Oct. 11, 1927.

1,645,425

UNITED STATES PATENT OFFICE.

HENRY HENSEL, OF MILWAUKEE, WISCONSIN.

SAUSAGE CASING AND METHOD OF MAKING THE SAME.

Application filed November 10, 1926. Serial No. 147,522.

This invention relates to the manufacture of pieced sausage casings.

The invention is predicated on my discovery that a straight sausage casing may be made up of a plurality of pieces of curved intestine The primary object of the invention therefore is to produce a sausage casing, known to the trade as a straight casing from a plurality of pieces of curved intestine sewed together.

Another object is to produce an article of exceedingly low cost by utilizing the curved intestine which has hitherto been considered as practically useless and which is sold at a price of about one fifteenth that of the straight intestine.

A further object is to provide a straight sausage casing which is thin and free from fat and also one which will present a pleasing appearance by virtue of its smooth outer surface.

The above named objects are of signal significance as they mark a radical departure from prior attempts to produce these large straight casings by sewing smaller intestines together; in that all prior attempts have made use of straight portions of the intestine known as beef middle. This intestine known as beef middle has a heavy lining of fat in it which must be removed at least in part before the intestine is fit for use in the manufacture of sausage casings. The task of scraping the fat from the intestine is a laborious one and very unsatisfactory as it is practically impossible to free the intestine of the fatty portion without tearing the outer wall. Hence the casing formed by such a portion of the intestine is of necessity relatively heavy and contains a great deal of fat.

A further object in producing a casing in the manner about to be described lies in the fact that the time of smoking the sausage housed in this casing is reduced to one fourth that required to smoke a sausage housed in the heavy fatty casing now in common use.

Other objects and advantages will appear from the following description of an illustrative embodiment of the invention.

In the drawings:

Figure 1 represents a portion of the curved intestine which is used in the manufacture of the casing.

Fig. 2 is a perspective view showing two pieces of the casing stitched together.

Fig. 3 is a perspective view showing a third portion of the casing stitched to the other two portions shown in Figure 2.

Fig. 4 is a fragmentary end view of the casing showing a method of stitching the three pieces together to form a rounded end to the casing.

Fig. 5 shows the sausage casing completed, filled and tied.

The following is a complete description of a method used to form a completed straight sausage casing 10 as shown in Figure 5 of the accompanying drawings, the casing being made up of a plurality of pieces 11, 12 and 13, in this instance three, which are sewed together along their side edges. These pieces are formed by slitting the curved intestine 14 (shown in Fig. 1) longitudinally, preferably along a vein 15 which lies on the inner side of the convolutions of the intestine and then cutting the strip into desired lengths to form the pieces 11, 12 and 13. In some instances, however, it may be deemed advisable to cut the intestine into proper lengths before slitting them. These intestines 14 are received by the sausage manufacturer in barrels in an aqueous solution and are termed salted. The operation of slitting the intestines is preferably performed after they have been blown up by means of compressed air and permitted to dry to the point where the succeeding operation of sewing the pieces together may readily be performed. Two pieces 11 and 12 (as shown in Fig. 2) are then sewed together along one of their side edges by means of the stitching 16. A third piece 13 of the intestine is then sewed along one side edge to the piece 11 by means of the stitching 17 and the remaining side edge is sewed to the free edge of piece 12 by means of the stitching 18. (As shown in Fig. 3.) After having the three pieces joined together in the form of a tube it may be deemed expedient to close one end of the tube. This is accomplished by means of a curved seam 19 best illustrated in Figure 4. The casing having been completely stitched on the reverse side is preferably turned inside out so that the seams left from the stitching will be hidden and the outer surface of the casing will be perfectly smooth.

The three pieces 11, 12 and 13 each having been cut from a curved intestine will have a tendency to twist even after they have been sewed together. It is by virtue of this twisting effect and the coaction between the three pieces that a straight casing is formed. When the casing is filled (as shown in Fig. 5) the stitching 16, 17 and 18 will follow a line of approximately helical form and thus produce a substantially straight casing from the curved pieces employed.

While an illustrative embodiment of the invention has been described with the use of three pieces to form the casing, it is understood that the same result may be accomplished by the use of two or more pieces and hence the invention is to be limited only to a plurality of pieces as defined in the appended claims.

I claim:—

1. A pieced sausage casing comprising a plurality of strips of curved intestines each formed by slitting the curved intestine longitudinally, and means for securing said strips together along their side edges, said strips coacting to produce a sausage casing of substantially straight form.

2. The method of producing pieced sausage casings from curved intestines which consists in longitudinally slitting pieces of curved intestines of appropriate lengths to open the same and securing said pieces together along their side edges to produce a sausage casing of straight form.

3. The method of producing pieced sausage casings from curved intestines which consists in taking pieces of curved intestines of appropriate lengths, slitting each piece longitudinally along the vein thereof to open the same, and securing said pieces together along their side edges to form a sausage casing of straight form.

4. The method of producing pieced sausage casings from curved intestines which consists in longitudinally slitting pieces of curved intestines of appropriate lengths to open the same, drying said pieces to permit sewing, and sewing said pieces together along their side edges to produce a sausage casing of substantially straight form.

In witness whereof, I hereunto subscribe my name this 5th day of November, 1926.

HENRY HENSEL.